United States Patent
Peterson

(10) Patent No.: US 6,776,559 B1
(45) Date of Patent: Aug. 17, 2004

(54) METHOD AND APPARATUS FOR DEPLOYING A COMMUNICATIONS CABLE BELOW THE SURFACE OF A BODY OF WATER

(75) Inventor: Kevin C. Peterson, Stuart, FL (US)

(73) Assignee: Gulf Fiber Corporation, Houston, TX (US)

( * ) Notice: Subject to any disclaimer, the term of this patent is extended or adjusted under 35 U.S.C. 154(b) by 0 days.

(21) Appl. No.: 10/259,690

(22) Filed: Sep. 30, 2002

(51) Int. Cl.[7] .................................................. F16L 1/00
(52) U.S. Cl. .................................... 405/158; 405/154.1
(58) Field of Search ............................. 405/154.1, 155, 405/158, 164, 165, 166, 168.1–168.4, 172–177, 158 M, 160.3

(56) References Cited

U.S. PATENT DOCUMENTS

| | | | |
|---|---|---|---|
| 5,722,793 A | * | 3/1998 | Peterson .................... 405/164 |
| 5,748,102 A | | 5/1998 | Barron ....................... 340/850 |
| 5,755,530 A | | 5/1998 | Garren ....................... 405/159 |
| 5,807,026 A | | 9/1998 | Valette ........................ 405/158 |
| 6,350,085 B1 | * | 2/2002 | Bath et al. ............... 405/154.1 |
| 6,588,980 B2 | * | 7/2003 | Worman et al. ............ 405/158 |

* cited by examiner

Primary Examiner—Thomas B. Will
Assistant Examiner—Tara L. Mayo
(74) Attorney, Agent, or Firm—Harrison & Egbert

(57) ABSTRACT

A method of deploying a communications cable below the surface of the body of water includes loading the cable around a reel within a housing, lowering the housing and the reel into the body of water, retrieving the connector of the cable from the housing, moving the connector and the attached cable to a position away from the housing, and connecting the connector to a subsea communications connection. An umbilical line is extended over a crane structure extending over the side of an offshore structure. The umbilical line is electronically connected to the communications cable. A remotely operated vehicle or a diver will intercept the connector and deliver the connector to the subsea communications connection.

11 Claims, 3 Drawing Sheets

METHOD AND APPARATUS FOR DEPLOYING A COMMUNICATIONS CABLE BELOW THE SURFACE OF A BODY OF WATER

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates to offshore communications systems. More particularly, the present invention relates to methods and apparatus for connecting a fiberoptic cable to a sub sea connection. Additionally, and furthermore, the present invention relates to methods for establishing a communications connection between offshore structures and sub sea connections.

BACKGROUND OF THE INVENTION

There is a need for fiberoptic connections to be made sub sea by using underwater mateable connectors. These underwater connectors are available from various manufacturers. These connections are typically made by divers or by remotely operated vehicles (ROVs).

Offshore industries are increasing their use of fiberoptic sensors and technology. The oil and gas industry has begun to adopt fiberoptic technology in order to provide reliable and high-speed communications connections to its subsea wells and production equipment. Fiberoptic cable technology is also being deployed to provide communications links from offshore facilities to onshore bases by way of submarine fiberoptic cables that run from the offshore site to the shore and then connecting to terrestrial fiberoptic systems and networks.

Various governmental and scientific organizations are also beginning to use fiberoptic cables and subsea connectors to access a wide variety of cables, sensors and subsea systems. As with the oil and gas industries, these connections are being made in ever increasingly deep water. This makes the deployment of the fiberoptic cables more complex and more expensive. In particular, it is a major challenge to get the fiberoptic cable from the surface, through the water column and to the sea floor in a reliable and cost effective manner. This challenge increases with the depth of the water in which communications equipment is to be placed.

One method of quickly connecting fiberoptic systems to the cables and equipment on the sea floor involves the use of a dedicated cable system. This is commonly known as a "riser." These risers are designed to be permanently installed on the structure so as to access the fiberoptic system below the surface. These risers are generally long lead time items. These risers must be permanently installed at a considerable expense. In the event of failure, the riser system may be offline for extended periods of time while replacement risers are being produced and installed. There is a need in the industry to provide the offshore industries with a simple cost-effective method of delivering a fiberoptic cable to the sea floor with a reusable and easily deployed device that can be quickly replaced or repaired.

Various patents have issued relating to such systems. For example, U.S. Pat. No. 6,350,085, issued on Feb. 6, 2002 to Bath et al., describes a cable deployment system and method of laying a cable on the sea floor. The cable deployment system includes a cable having a first cable section connected to the riser cable section. The riser cable section includes an arm that is connected to a drum capable of containing the required length of the first cable section. A stinger is attached to the drum and shaped to allow the first cable section to exit the drum. The cable deployment system also includes a tension device attached to the drum. The tension device is capable of maintaining a tension in the first cable section during the deployment of the first cable section from the drum. The method of deploying the cable in deep water from the surface includes the steps of containing the first cable section within the drum and lowering the drum from the surface vessel. An end of the first cable section is secured to the sea floor and the first cable section is deployed from the drum onto the sea floor.

U.S. Pat. No. 5,807,026, issued on Feb. 19, 1998 to J. M. Valette, teaches a device for pulling the end of a fiberoptic cable. This device includes a hollow anchoring body having an axial passage formed in the front end thereof suitable for receiving an end of the cable. The anchoring body has an integral hollow cylindrical skirt coaxially extending rearwardly therefrom. The skirt receives an axially positioned insulating ring and a clamping assembly that is located radially inwardly of the ring. A removable hollow cover axially abuts the anchoring body and covers the cylindrical skirt. A terminal plate is located at an end of the hollow casing opposite the cylindrical skirt so as to connect stripped fibers thereto.

U.S. Pat. No. 5,755,530, issued on May 26, 1998 to D. L. Garren, teaches a cable laying apparatus for an underwater cable burial machine. This apparatus utilizes a pivotally liftable depressor wheel located within a feed shoe which tracks the groove by the plow. A pair of arcuate cable guides assist the guidance of both cables and bodies without permitting either to bind. When the assembly to which the depressor wheel is attached is raised upward and rearward, the guides prevent the cable from escaping while allowing a body to pass through the opening which is formed.

U.S. Pat. No. 5,748,102, issued on May 5, 1998 to T. D. Barron, describes an apparatus for connecting an underwater vehicle and a free floating communications pod. This apparatus includes a communication cable depending from the pod and extending to a buoy of greater buoyancy than the pod. The cable carries communication signals between the pod and the buoy and extends generally vertically in a column of water between the pod and the buoy. The buoy is in communication with a distal station. The apparatus further includes a mobile unmanned underwater vehicle having therein guidance means for directing the vehicle to the cable. The vehicle is in communication with a control vessel. A connector means is mounted in a nose section of the vehicle and is adapted to intercept the cable. The connector means further is adapted to permit the cable to slide therethrough as the vehicle continues movement after intercepting the cable. A complementary alignment means on the vehicle and the pod is adapted to cause the vehicle to engage the pod in a pre-selected orientation and azimuth. When the communications component of the underwater vehicle and the pod are in alignment, the control vessel will be in communication with the distal station.

It is an object of the present invention to provide a simple and cost effective method of delivering a fiberoptic cable to the sea floor with a reusable and easily deployed device that can be quickly repaired and replaced.

It is another object of the present invention to provide a method of deploying a fiberoptic cable for which the communications connections can be established in a very fast manner.

It is further object of the present invention to provide a fiberoptic cable management system and method whereby the cable can be easily connected and disconnected from a subsea communications connection.

These and other objects and advantages of the present invention will become apparent from a reading of the attached specification and appended claims.

BRIEF SUMMARY OF THE INVENTION

The present invention is a method of deploying a communications cable below the surface of a body of water comprising the steps of: (1) loading the cable around a reel within a housing so as to have a connector positioned at an end of the cable; (2) lowering the housing and the reel into the body of water for a desired distance; (3) retrieving the connector of the cable from the housing; (4) moving the connector and the attached cable to a position away from the housing; and (5) connecting the connector to a subsea communications connections.

In the present invention, the housing and the reel are positioned off of the side of a structure positioned above the surface of the body of water. The cable is connected to a communications device on the structure. An umbilical line is extended over a crane structure on a side of the structure. This umbilical line is electronically connected to the communications cable. The umbilical line is secured through a winch positioned on the structure. The winch is rotatable so as to lower the housing and the reel into the body of water.

In the present invention, the structure that is located above the body of water can be either an offshore oil rig or a vessel. The reel is actuated so as to unwind the cable from the reel such that the connection moves away from the housing.

In the present invention, the step of retrieving includes deploying a remotely operated vehicle below the surface of the body of water and intercepting the connector by the remotely operated vehicle. The remotely operated vehicle is controlled so as to deliver the connector to the subsea communications connection. Alternatively, the present invention can utilize a diver in place of the remotely operated vehicle if the subsea connection is not too deep below the surface of the water.

Also, the present invention includes the step of releasing the connector from the subsea communications connection, reeling the communications cable and connector back into the housing, and then lifting the housing and reel outwardly and above the surface of the body of water.

In the present invention, the communications cable is a fiberoptic cable.

DETAILED DESCRIPTION OF THE INVENTION

Figure 1:
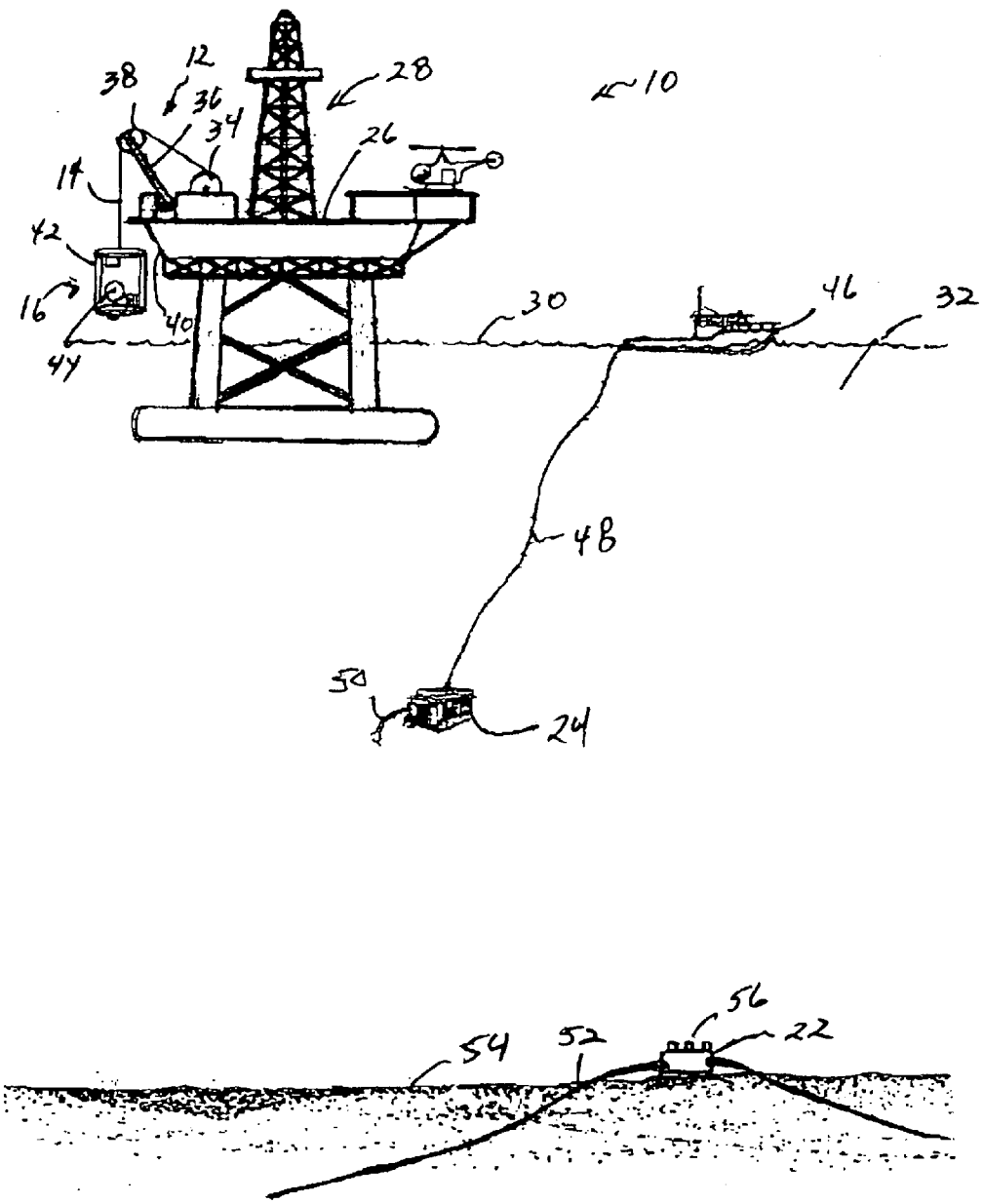
FIG. 1 is an illustration of the initial steps associated with the method of the present invention.

Referring to FIG. 1, there is shown the fiberoptic cable management system 10 in accordance with the teachings of the present invention. The combination of the components of the system 10, along with the method of operation, provides a unique capability for the deployment and connection of fiberoptic cables in the ocean environment. The system 10 includes a launch and recovery system 12, a composite umbilical line 14, a subsea unit 16, a fiberoptic cable 18, and underwater mateable fiberoptic connector 20. Each of these systems are arranged so as to allow proper connection to a subsea communications connection 22 through the use of a remotely operated vehicle (or diver) 24.

With reference to FIG. 1, it can be seen that the launch and recovery system 12 is mounted on the platform 26 of an offshore oil rig 28. The oil rig 28 is positioned above the surface 30 of the body of water 32. In the position shown in FIG. 1, the launch and recovery system 12, the composite umbilical line 14, and the subsea unit 16 are all positioned above the surface 30 of the body of water 32. The arrangement shown in FIG. 1 is prior to the deployment of the fiberoptic cable 18 and the underwater mateable fiberoptic connector 20.

The launch and recovery system 12 includes a winch 34 rotatably mounted upon the platform 26 of the offshore oil rig 28. An A-frame crane support 36 is pivotally mounted relative to the winch 34 so as to have sheave 38 extending outwardly beyond the side edge 40 of the platform 26. As a result, the composite umbilical cable 14 will extend beyond the side 40 of the offshore oil rig 28 and is in a proper position for deployment. The winch 34 is suitably rotatable by controls located on the platform 26 so as to allow the winding and unwinding of the umbilical line 14 around the winch 34. When it is desired to deploy the subsea unit 16, the drum of the winch 34 will rotate in one direction so that the umbilical line 14 is unwound therefrom such that the subsea unit 16 will lower downwardly into the body of water 30 below the surface 30. The offshore oil rig 28 contains communications equipment thereon. In the illustration of FIG. 1, it is desired to connect the communications equipment with the subsea communications connector 22. Ideally, the umbilical line 14 will include fiberoptic elements that will suitably connect to the communications system on the platform 26 of the offshore oil rig 28.

The umbilical line 14 provides the fiberoptic cable link to the on-board communications system of the offshore oil rig 28 and is also used to lower and retrieve the subsea unit 16. The composite umbilical line 14 also can include control cables thereon so as to operate the various controls within the subsea unit 16.

The subsea unit 16 includes a housing 42 in which a reel 44 is positioned. Reel 44 is part of an underwater winch and cable management system. The housing 42 can also include power systems, sensors and other controls required to operate the subsea units 16. The subsea unit 16 is connected to the umbilical line 14, as shown in FIG. 1, above the surface 30 and the body of water 32. The subsea unit 16 is used to deploy and manage the fiberoptic cable which links the subsea connection 22 to the underwater mateable fiberoptic connector 20. The fiberoptic cable is stored around the reel 44 of the winch within the housing 42 as the subsea unit 16 is lowered to the desired water depth. The fiberoptic cable around the reel 44 can then be deployed as the remotely operated vehicle (ROV) or diver pulls the cable 18 toward its destination. When it is desired to disconnect the connector 20 from the subsea connection 22, the reel 44 can be suitably actuated so as to retract the cable back into the housing 16 while the umbilical line 14, and its associated winch 34, pulls the housing 42 upwardly out of the body of water 32.

In FIG. 1, it can be seen that there is a vessel 46 floating on the surface 30 of the body of water 32. Vessel 46 includes a control cable 48 extending therefrom to the remotely operated vehicle 24. The remotely operated vehicle 24 includes an arm 50 extending therefrom and which is actuatable by an operator on the vessel 46 through the signals provided by the control cable 48.

The subsea communications connection 22 is suitably connected to a buried cable 52 resting below the bottom 54 of the body of water 32. The subsea communications connection 22 includes suitable quick-connect elements 56 thereon which will easily allow the connector 20 to be joined thereto.

Figure 2:
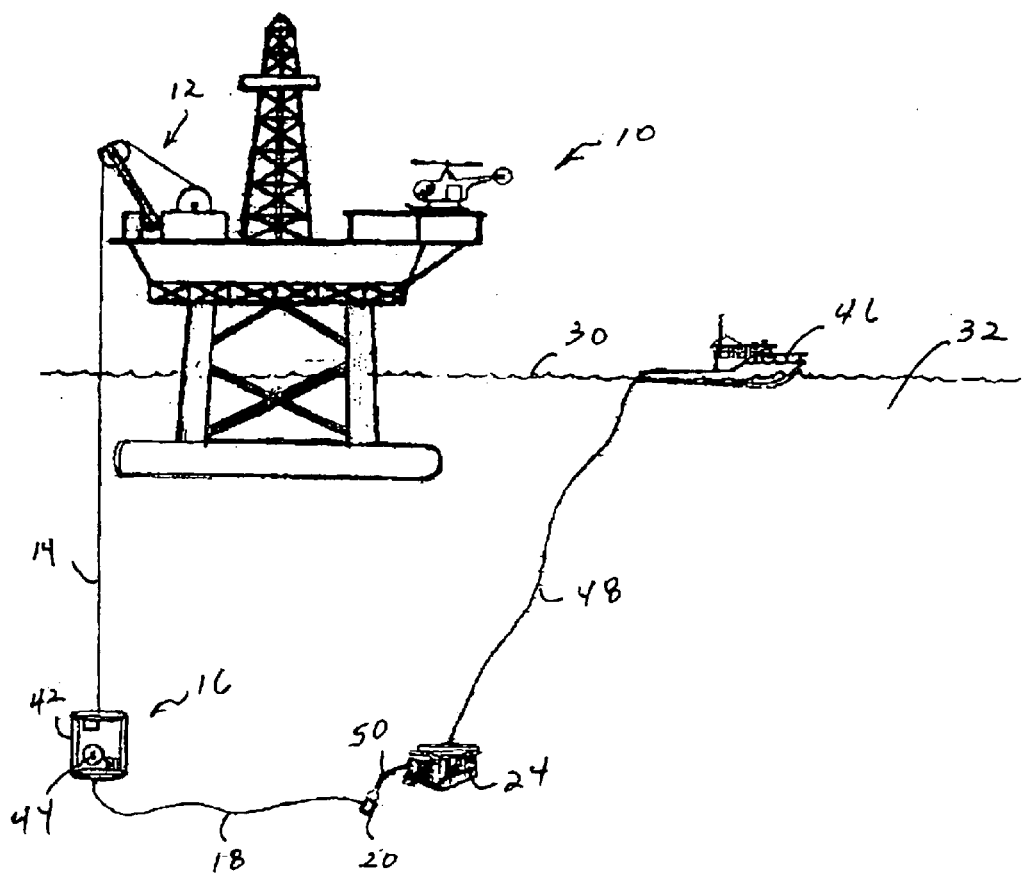
FIG. 2 is an illustration showing the intermediate steps associated with the method of the present invention.
Figure 2:

In FIG. 2, it can be seen that the arm 50 of the ROV 24 has grasped the underwater mateable fiberoptic connector 20 attached to the end of the fiberoptic cable 18. Control signals are passed through the control cable 48 from an operator on the vessel 46. In FIG. 2, it can be seen that the ROV 24 is pulling the cable 18 toward the subsea communications connection 22.

The fiberoptic cable 28 is electronically connected to the fiberoptic lines associated with the umbilical line 14. The fiberoptic cable 18 is wound around the reel 44 until it is deployed into the body of water 32. Once the subsea unit 16 has reached its desired location below the surface 30 of the body of water 32, the cable 18 is deployed, and unreeled, by the reel 44 as the ROV 24 requires slack in order to route the cable 18 toward the subsea connection 22. The length of the fiberoptic cable 18 will depend upon specific application. Normally, the cable 18 will have a length of between several hundred feet to many miles.

Figure 3:
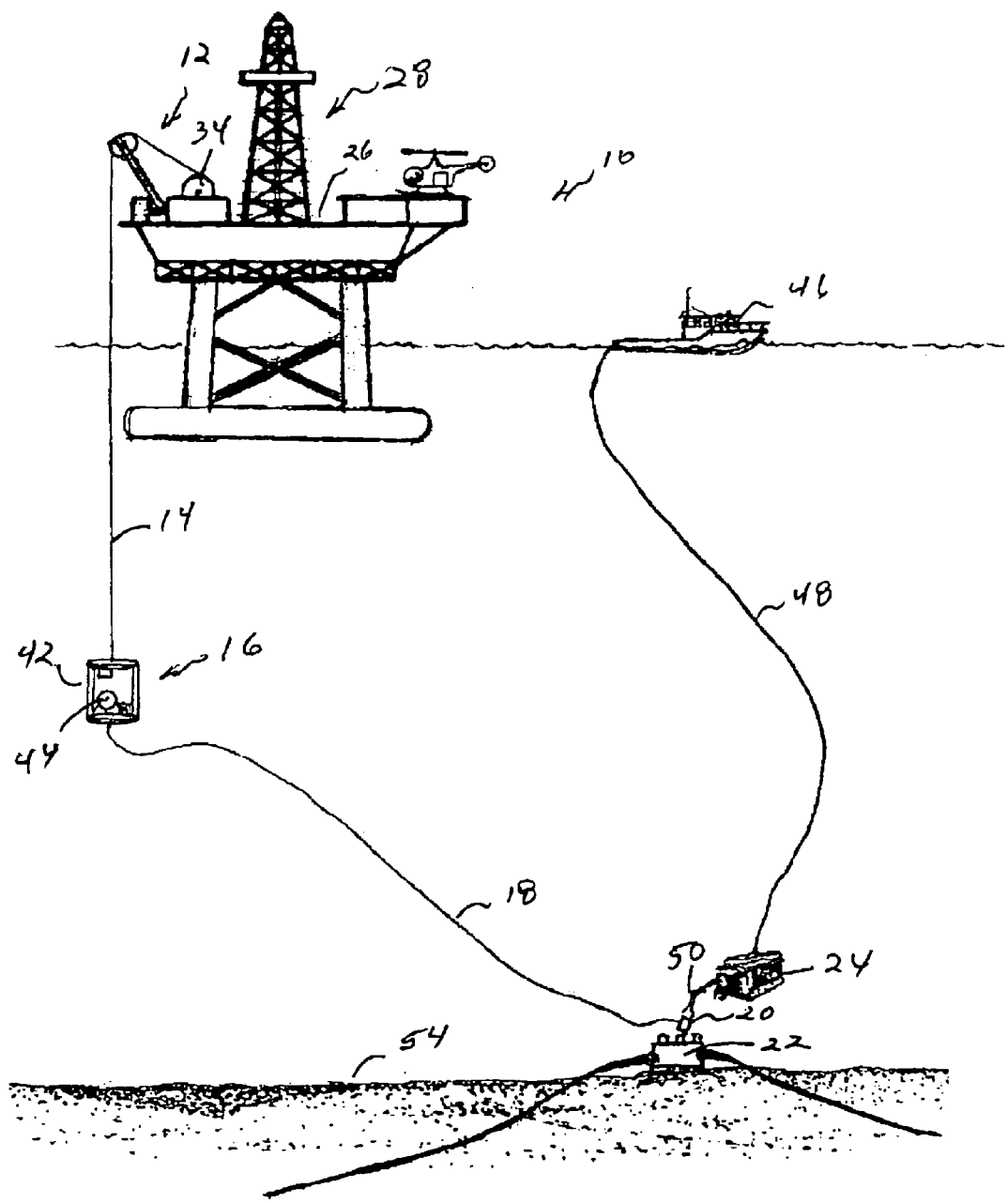
FIG. 3 is and illustration of finishing steps associated with the method of the present invention.

In FIG. 3, it can be seen that the remotely operated vehicle 24 has moved the connector 20 at the end of the fiberoptic cable 18 to the subsea communications connection 22. The arm 50 of the ROV 24 can suitably manipulate the connector 20 so as to engage the quick-connect (or quick-disconnect) of communications connection 22. Once the connector 20 is joined to the subsea communications connection 22, the fiberoptic cable 18 can transmit signals back to the subsea unit 16 and back to the offshore oil rig 28 by way of umbilical line 14. The arm 50 of the ROV 24 can then be released from the connector 20 and returned to the surface. The relationship between the connector 20 of the fiberoptic cable 18 and the subsea communications connection 22 allows for a secure and proper connection for the purposes of offshore communications. The system 10 of the present invention can provide the offshore industry with a simple and cost-effective method of delivering the fiberoptic cable 18 to the sea floor 54 with a reusable and easily deployable device that can be repaired or easily replaced. When communications are no longer necessary, to its home, the ROV 24 can be returned to the sea floor 24 so as to grasp the connector 20 and separate the connector from the subsea communications connection 22. The reel 44 within the housing 42 of the subsea unit 16 can then reel the fiberoptic cable 18 thereinto. Once the fiberoptic cable 18 has been returned to the interior of the housing 42, the umbilical line 14 can be suitably retracted through the reverse turning of the winch 34. The subsea unit 16, and its associated fiberoptic cable 18, can then be stored upon the platform 26, or other locations on the offshore oil rig 28.

It should be noted that the present invention is equally applicable to other offshore structures and/or vessels, other than the oil rig 28 illustrated in the figures of the present application.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. A method of deploying a communications cable below a surface of a body of water comprising:
   loading the cable around a reel within a housing, the cable having a connector positioned at an end thereof;
   lowering the housing and the reel into the body of water for a desired distance;
   retrieving the connector of the cable from the housing;
   moving the connector and the attached cable to a position away from the housing; and
   connecting the connector to a subsea communications connection.

2. The method of claim 1, further comprising:
   positioning the housing and the reel off of a side of a structure positioned above the surface of the body of water.

3. The method of claim 2, further comprising:
   connecting the cable to a communications device positioned on said structure.

4. The method of claim 3, further comprising:
   extending an umbilical line over a crane on said structure, said umbilical line being electronically connected communications cable; and
   securing said umbilical line to a winch positioned on said structure, said winch being rotatable so as to lower the housing and the reel into the body of water.

5. The method of claim 4, said structure being an oil rig.

6. The method of claim 4, said structure being a vessel.

7. The method of claim 1, further comprising:
   actuating said reel so as to unwind the cable from the reel such that said connector moves away from said housing.

8. The method of claim 1, said step of retrieving comprising:
   deploying a remotely operated vehicle below the surface of the body of water; and
   intercepting the connector by said remotely operated vehicle, said step of moving comprising controlling said remotely operated vehicle so as to deliver said connector to said subsea communications connection.

9. The method of claim 8, said step of retrieving comprising:
   deploying a diver below the surface of the body of water; and
   intercepting the connector by the diver, said step of moving comprising grasping the connector of the attached communications cable by the diver and swimming to said subsea communications connection.

10. The method of claim 1, further comprising:
    releasing said connector from said subsea communications connection;
    reeling said communications cable and said connector back into said housing; and
    lifting said housing and said reel outwardly above the surface of the body of water.

11. The method of claim 1, said communications cable being a fiberoptic cable.

* * * * *